United States Patent
Sorhuus et al.

(10) Patent No.: US 8,979,980 B2
(45) Date of Patent: Mar. 17, 2015

(54) GAS CLEANING UNIT AND METHOD FOR CLEANING GAS

(75) Inventors: Anders Kenneth Sorhuus, Ski (NO); Odd Edgar Bjarno, Oslo (NO)

(73) Assignee: ALSTOM Technology Ltd, Baden (CH)

( * ) Notice: Subject to any disclaimer, the term of this patent is extended or adjusted under 35 U.S.C. 154(b) by 222 days.

(21) Appl. No.: 13/810,198

(22) PCT Filed: Jun. 28, 2011

(86) PCT No.: PCT/IB2011/001508
§ 371 (c)(1),
(2), (4) Date: Mar. 24, 2013

(87) PCT Pub. No.: WO2012/007809
PCT Pub. Date: Jan. 19, 2012

(65) Prior Publication Data
US 2013/0206005 A1  Aug. 15, 2013

(30) Foreign Application Priority Data
Jul. 14, 2010  (EP) ................................. 10169519

(51) Int. Cl.
*B01D 53/02* (2006.01)
*C25C 3/22* (2006.01)
(Continued)

(52) U.S. Cl.
CPC ........ *B01D 53/1406* (2013.01); *B01D 53/0446* (2013.01); *B01D 53/10* (2013.01); *B01D 53/508* (2013.01); *B01D 53/62* (2013.01); *B01D 53/685* (2013.01); *B01D 53/78* (2013.01); *B01D 53/83* (2013.01); *B01D 2253/104* (2013.01);
(Continued)

(58) Field of Classification Search
USPC ............ 204/247; 205/391; 95/114, 131, 137; 96/121, 126
See application file for complete search history.

(56) References Cited

U.S. PATENT DOCUMENTS 2,252,739 A   8/1941  Stoever
3,063,219 A  11/1962  Copcutt
(Continued)

FOREIGN PATENT DOCUMENTS

CN      2861186    1/2007
DE     37 21 039   1/1989
(Continued)

OTHER PUBLICATIONS

Dethloff, et al., "*Heat Recovery from Pot Gas from Electrolytic Reduction Cells for Producing Aluminum*", Journal of Metals, Mar. 1984, pp. 56-60.

(Continued)

*Primary Examiner* — Frank Lawrence (57) ABSTRACT

A gas cleaning unit for cleaning a main raw gas stream from a plant comprises a plurality of gas cleaning chambers (34a-c), each gas cleaning chamber (34a-c) equipped with a cleaning chamber inlet (46a-c); an inlet manifold (32), for dividing said main raw gas stream flowing therethrough into a plurality of separate fractional raw gas streams for flow to said cleaning chamber inlets (46a-c); and a plurality of heat exchangers (40a-c), each heat exchanger (40a-c) being located downstream of the inlet manifold (32) for exchanging heat with a respective fractional raw gas stream entering a respective cleaning chamber (34a-c).

20 Claims, 4 Drawing Sheets

(51) Int. Cl.
- *B01D 53/14* (2006.01)
- *B01D 53/78* (2006.01)
- *B01D 53/83* (2006.01)
- *B01D 53/04* (2006.01)
- *B01D 53/10* (2006.01)
- *B01D 53/50* (2006.01)
- *B01D 53/62* (2006.01)
- *B01D 53/68* (2006.01)

(52) U.S. Cl.
CPC ... *B01D2257/2047* (2013.01); *B01D 2257/302* (2013.01); *B01D 2257/504* (2013.01); *B01D 2259/40001* (2013.01); *C25C 3/22* (2013.01)
USPC ............... 95/114; 96/126; 204/247; 205/391

(56) References Cited

U.S. PATENT DOCUMENTS

| | | | |
|---|---|---|---|
| 3,603,572 | A | 9/1971 | Rosentern |
| 3,654,769 | A | 4/1972 | Linde |
| 4,501,599 | A | 2/1985 | Loukos |
| 4,585,057 | A * | 4/1986 | Marburger ................. 165/134.1 |
| 4,601,114 | A | 7/1986 | Noguchi |
| 4,613,344 | A | 9/1986 | Henrich et al. |
| 5,321,946 | A | 6/1994 | Abdelmalek |
| 5,485,686 | A * | 1/1996 | Sears, Jr. .......................... 34/473 |
| 5,635,142 | A * | 6/1997 | Ichiki et al. ................... 422/177 |
| 5,658,361 | A | 8/1997 | Arencibia, Jr. |
| 5,885,539 | A | 3/1999 | Bjarno et al. |
| 6,022,389 | A | 2/2000 | Vross et al. |
| 6,368,389 | B1 | 4/2002 | Birke et al. |
| 7,187,549 | B2 * | 3/2007 | Teneketges et al. .......... 361/699 |
| 7,438,744 | B2 | 10/2008 | Beaumont |
| 2003/0037672 | A1 * | 2/2003 | Sircar ............................... 95/96 |

FOREIGN PATENT DOCUMENTS

| | | |
|---|---|---|
| EP | 0870529 A1 | 10/1998 |
| EP | 2 181 753 | 5/2010 |
| FR | 2198773 A1 | 4/1974 |
| GB | 704340 | 2/1954 |
| GB | 1403892 A | 8/1975 |
| JP | 59-115986 | 7/1984 |
| JP | 370978 | 3/1991 |
| WO | 2006009459 A1 | 1/2006 |
| WO | 2007/096492 | 8/2007 |
| WO | 2008113496 A1 | 9/2008 |
| WO | 2009/000992 | 12/2008 |

OTHER PUBLICATIONS

Sorhuus, et l., "*Pot Gas Heat Recovery and Emission Control*", The Minerals, Metals & Materials Society (TMS), 2009.

Fleer et al., "*Heat Recovery from the Exhaust Gas of Aluminum Reduction Cells*", The Minerals, Metals & Materials Society (TMS), 2010.

Naess et al., "*Experimental Investigation of Particulate Fouling in Waste Heat Recovery from the Aluminum Industry*", 13th Intl Heat Transfer Conference, Sydney, Australia, 2006.

European Search Report, European Patent Application No. 10169519, Search Completed Nov. 29, 2010, The Hague.

International Search Report and Written Opinion, International Searching Authority, PCT Application No. PCT/IB2011/001508, Search Completed Nov. 23, 2011, Authorized Officer Francesca Focante.

* cited by examiner

GAS CLEANING UNIT AND METHOD FOR CLEANING GAS

This is a US National Phase application claiming priority to International Application No. PCT/IB2011/001508 having an International Filing Date of Jun. 28, 2011, incorporated herein in its entirety by reference.

FIELD OF THE INVENTION

The present invention relates to a gas cleaning unit for cleaning a main raw gas stream from a plant. The gas cleaning unit comprises an inlet manifold; and a plurality of gas cleaning chambers, each equipped with a cleaning chamber inlet. The inlet manifold divides a main raw gas stream flowing therethrough into a plurality of separate fractional raw gas streams prior to flow to said cleaning chamber inlets. The invention also relates to a method for cleaning a main raw gas stream.

BACKGROUND

Aluminium is often produced by means of an electrolysis process using one or more aluminium production electrolytic cells. Such electrolytic cells typically comprise a bath for containing bath contents comprising fluoride containing minerals on top of molten aluminium. The bath contents are in contact with cathode electrode blocks, and anode electrode blocks. Aluminium oxide is supplied on regular intervals to the bath via openings at several positions along the center of the cell and between rows of anodes.

The electrolytic reaction taking place in the electrolytic cells generates a hot effluent gas that comprises gaseous components that are undesired in the atmosphere, including hydrogen fluoride, sulphur dioxide, and the like. The process also generates fine dust. The undesired gaseous components and the dust must be disposed of in an environmentally conscientious manner; hence, the raw gas is cleaned in a gas cleaning unit, to preferably remove any undesired components as efficiently as possible. Dust and gaseous components such as hydrogen fluoride may be returned to the aluminium production cells, where they may be of benefit for the production process.

A typical gas cleaning unit may comprise a dry scrubber and a dust filter, e.g. a fabric filter that may be of the bag filter type. A consideration of such systems is that energy-consuming fans are often necessary in flue gas treatment systems to actively draw the raw gas through the gas cleaning unit. Such is the case since the gas cleaning unit may introduce a flow resistance in the flue gas treatment system.

Another consideration of current gas cleaning units is that the same may constitute a significant investment and may require significant installation space. Still another consideration is that current flue gas treatment systems may require cooled flue gas. This requirement may be dictated by, e.g., the temperature sensitivity of any downstream equipment, or by the temperature dependency of the cleaning efficiency of the gas cleaning unit. In many installations, the flue gas is cooled upstream of the gas cleaning unit by diluting it with atmospheric air of ambient temperature.

WO 2008/113496 suggests, as an alternative solution to dilution with ambient temperature air, the use of a heat exchanger resistant to scaling, i.e. the formation of deposits of dust and fouling on its inner surfaces, which makes it particularly suitable for cooling uncleaned gas.

Finally, gas cleaning units should preferably offer high reliability, or, alternatively, back-up systems should be provided, since it may be very expensive and/or troublesome to stop and re-start the electrolytic aluminum production process that depend on effective operation of associated gas cleaning units.

SUMMARY

According to aspects described and illustrated herein, at least some of the above drawbacks and deficiencies of the prior art are overcome or alleviated by the subject gas cleaning unit for cleaning a main raw gas stream from a plant. The subject gas cleaning unit comprises a plurality of gas cleaning chambers, each gas cleaning chamber equipped with a cleaning chamber inlet;

an inlet manifold, for dividing a main raw gas stream flowing therethrough into a plurality of separate fractional raw gas streams prior to flow to said cleaning chamber inlets; and a plurality of heat exchangers, each heat exchanger located downstream of the inlet manifold for exchanging heat with a respective fractional raw gas stream entering a respective cleaning chamber.

Each heat exchanger is associated with a flow resistance, and hence induces a pressure drop thereacross. The pressure drop across each of the heat exchangers operates so as to share the main raw gas stream more uniformly between the individual cleaning chambers. Furthermore, the pressure drop across the heat exchangers operates so as to somewhat compensate for any variations of the pressure drop across an individual cleaning chamber relative to the other cleaning chambers. This allows for a more stable and reliable gas cleaning process.

According to an embodiment, each of the heat exchangers is located at a respective cleaning chamber inlet. Thereby, it may share e.g. the support structure, the access platforms, the lighting, etc. with the cleaning chamber.

According to an embodiment, each heat exchanger has an outlet arranged for discharging raw gas directly into the respective cleaning chamber. Thereby, a more uniform spatial distribution of the flow of each individual, fractional raw gas stream into the respective cleaning chambers may be obtained, since the pressure drop across each heat exchanger operates so as to level the gas speed profile over the entire outlet area of that heat exchanger.

According to an embodiment, each of said heat exchangers comprises a raw gas inlet chamber for receiving a fractional raw gas stream, and a plurality of mutually parallel raw gas cooling tubes that are spaced apart. Thereby, a low degree of scaling and a low energy loss due to heat exchanger flow resistance may be obtained.

According to an embodiment, each raw gas cooling tube has a cooling tube inlet funnel for accelerating raw gas into the cooling tube. The inlet funnels may reduce the scaling and may result in a reduced cooling tube flow resistance. Furthermore, the inlet funnels may provide a more uniform raw gas speed profile over the cross-section of each tube.

According to an embodiment, the raw gas cooling tubes stand vertically; thereby, less dead space is formed near any horizontal surface where dust may settle.

According to an embodiment, each of said gas cleaning chambers comprises a dry scrubber having said respective heat exchanger arranged at a raw gas inlet located in a lower portion thereof. The benefits of arranging a heat exchanger at each cleaning chamber inlet are of particularly high value when the cleaning chambers comprise dry scrubbers, since dry scrubbers may be particularly sensitive to variations in the gas flow therethrough. The individual heat exchangers may operate so as to distribute the gas flow more uniformly, both between the individual dry scrubbers, and across the inlet of each individual dry scrubber. Furthermore, the heat exchangers may be configured to accelerate the raw gas into the scrubbers, thereby improving the mixing of the raw gas with the scrubber dry sorbent.

According to an embodiment, said plant comprises a plurality of electrolytic cells for producing aluminium using the Hall-Héroult process, and said raw gas is flue gas generated in said Hall-Héroult process.

According to an embodiment, each of said cleaning chambers is provided with an inlet damper, which is located between the respective heat exchanger and the inlet manifold. The same inlet damper can thereby be used for isolating both an individual heat exchanger, e.g. when servicing that individual heat exchanger, and for isolating the cleaning chamber corresponding to that individual heat exchanger, e.g. when cleaning a filter.

According to an embodiment, the gas cleaning unit further comprises an outlet manifold for connecting all cleaning chambers to an output stack.

According to other aspects illustrated herein, the above drawbacks and deficiencies of the prior art are overcome or alleviated by a method for cleaning a main raw gas stream, comprising dividing said main raw gas stream into a plurality of fractional raw gas streams; and individually cooling each of said fractional raw gas streams using a plurality of respective heat exchangers so as to obtain a plurality of cooled fractional raw gas streams to be individually cleaned.

According to an embodiment, the method comprises individually discharging each of said fractional raw gas streams directly from an outlet of the respective heat exchanger into a respective cleaning chamber.

According to an embodiment, each of said fractional raw gas streams is cooled in a heat exchanger comprising a raw gas inlet chamber for receiving a fractional raw gas stream, and a plurality of mutually parallel raw gas cooling tubes that are spaced apart, each raw gas cooling tube having a cooling tube inlet funnel for accelerating raw gas into the cooling tube.

According to an embodiment, the method comprises introducing each of said plurality of cooled fractional raw gas streams into the lower portion of a dry scrubber.

According to an embodiment, said main raw gas stream is generated by a Hall-Héroult aluminium production process.

According to an embodiment, the method comprises individually controlling the flow of each of the fractional raw gas streams into the respective heat exchangers.

BRIEF DESCRIPTION OF THE DRAWINGS

The above, as well as additional objects, features and advantages, will be better understood through the following illustrative and non-limiting detailed description of exemplary embodiments, with reference to the appended drawings, wherein like elements are numbered alike, wherein.

DETAILED DESCRIPTION OF THE EXEMPLARY EMBODIMENTS

Figure 1:
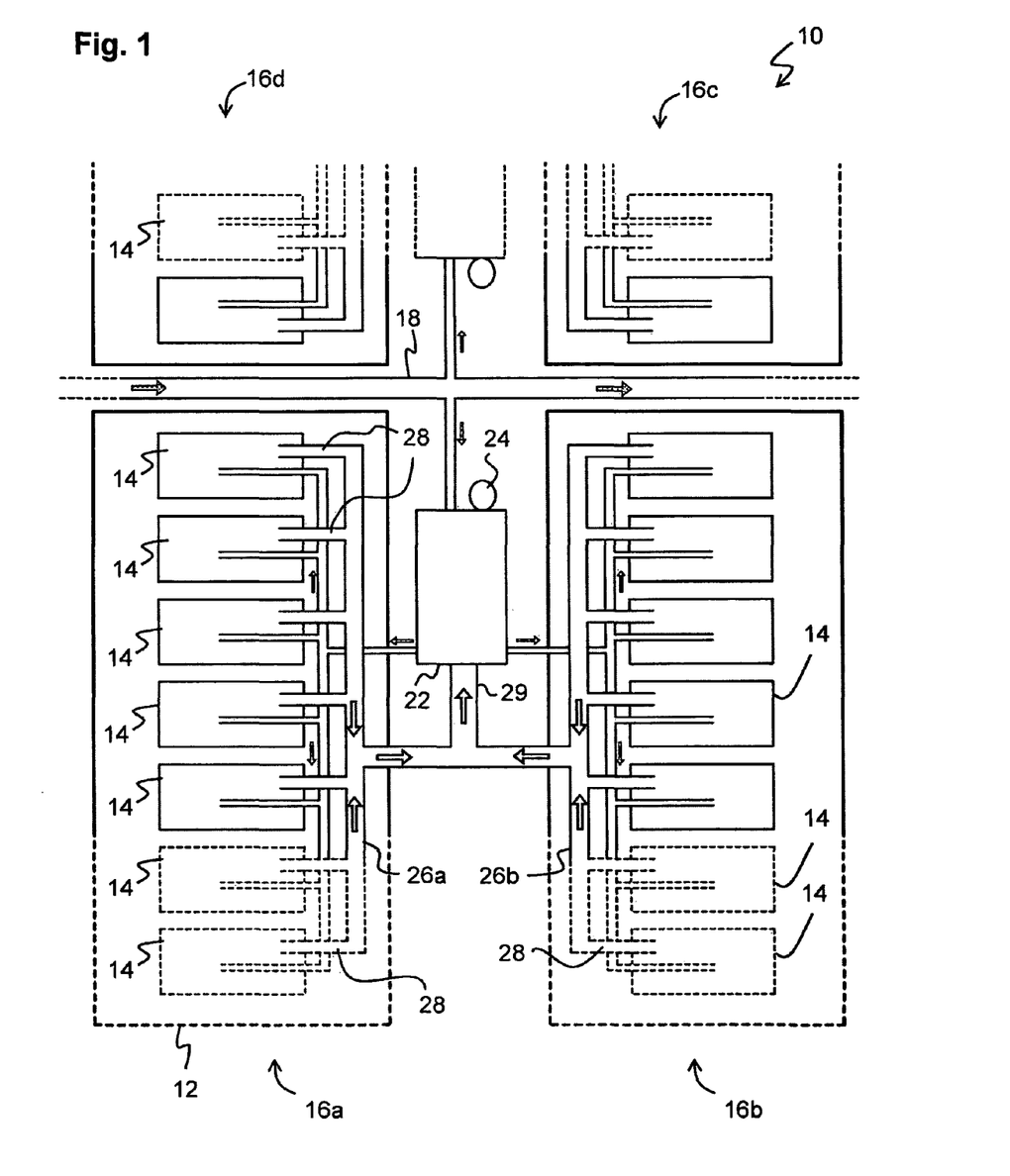
FIG. 1 is a diagrammatic plan view of an aluminium production plant.

FIG. 1 is a schematic representation of an aluminium production plant 10 as seen from above. The aluminium production plant 10 comprises a plurality of electrolytic cell rooms 12, each comprising a number of aluminium production smelting pots, or electrolytic cells, 14. The electrolytic cells 14 are arranged in potlines 16 in the manner well known to those skilled in the art. FIG. 1 illustrates four potlines 16a-16d; however, an aluminium production plant 10 may typically comprise from 1 to 20 potlines. And even though only a few electrolytic cells 14 are illustrated in each potline 16a-d of FIG. 1, a single potline 16, which is typically located in its own electrolytic cell room 12, may typically comprise from 50 to 200 electrolytic cells 14. The dashed lines of FIG. 1 indicate that each of the potlines 16a-d may comprise a number of additional electrolytic cells 14, and that the plant may comprise additional potlines.

The process occurring in the electrolytic cells 14 may be the well-known Hall-Héroult process, in which aluminium oxide, which is dissolved in a melt of fluorine containing minerals, is electrolysed to form aluminium. Hence, the electrolytic cells 14 function as electrolysis cells. Powdered aluminium oxide is fed to the electrolytic cells 14 via an alumina distribution system 18.

The electrolysis process occurring in each electrolytic cell 14 generates large amounts of heat, and also dust particles and effluent gases, including but not limited to hydrogen fluoride, sulphur dioxide and carbon dioxide. In this disclosure, the term raw gas denotes uncleaned gas from an industrial process, such as the hot flue gas from an electrolytic smelting pot 14. A raw gas collection system 20 is configured to collect and transport the raw gas from a plurality of electrolytic cells 14 to a gas cleaning unit 22, which cleans the raw gas such that it can safely be emitted to the atmosphere via a smokestack 24. Often, fresh alumina is used in the gas cleaning unit 22 for dry scrubbing of the raw gas; therefore, alumina is distributed to the pots 14 via the gas cleaning unit 22.

Typically, a raw gas collection system 20 is configured to collect the raw gas from one or two potlines 16, and a gas cleaning unit 22 is often connected to a pair of mirrored potlines 16a, 16b according to the well-known "H" configuration illustrated in FIG. 1. However, even though the potlines 16a-b are illustrated in FIG. 1 as being connected to a single gas cleaning unit 22, each single potline 16a-d may be connected to multiple gas cleaning units 22. Alternatively, multiple potlines 16a-d, or even an entire aluminium production plant 10, may be connected to one single, centralized gas cleaning unit 22.

For each potline 16a-b served by a raw gas collection system 20, the raw gas collection system 20 comprises a potline duct 26a, 26b, each of which stretches along its respective potline 16a-b. Each potline duct 26a-b is fluidly connected to the electrolytic cells 14 of its respective potline 16a-b via a plurality of branch ducts 28. By way of example, the potline duct 26a is fluidly connected to the interior of each of the electrolytic cells 14 of the potline 16a via a number of branch ducts 28, which number corresponds to the number of electrolytic cells 14 of the potline 16a. The two potline ducts 26a, 26b converge to a main duct 29 for transporting a main raw gas stream into the gas cleaning unit 22.

The raw gas collection system 20 operates by under-pressure, which is created by a fan 30 (FIG. 3) in the gas cleaning unit 22. Hence, the raw gas collection system 20 actively draws raw gas from the electrolytic cells 14, via the branch ducts 28, the potline ducts 26a-b, and the main duct 29, into the gas cleaning unit 22.

Figure 2:
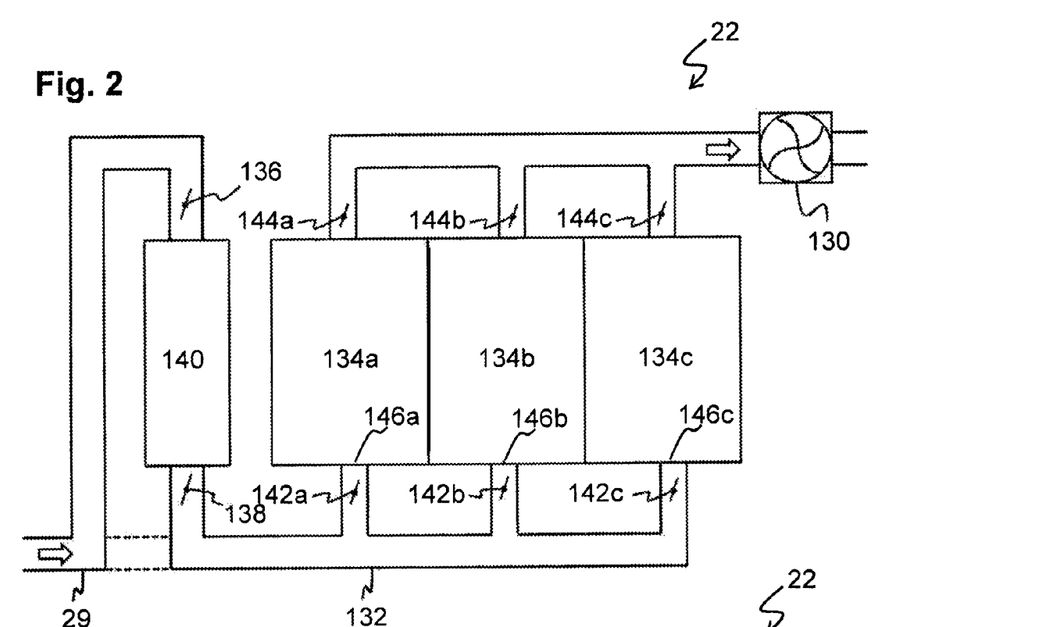
FIG. 2 is a schematic drawing of a gas cleaning unit.

FIG. 2 illustrates a gas cleaning unit 22, which is provided with a heat exchanger 140 of the type discussed in WO 2008/113496. The gas cleaning unit 22 comprises three separate gas cleaning chambers 134a, 134b, 134c. The main raw gas stream arriving to the cleaning unit 122 in the main duct 29 is divided into three fractional raw gas streams in an inlet manifold 132. Each gas cleaning chamber 134a-c is provided with a cleaning chamber inlet 146a-c for receiving a fractional raw gas stream from the inlet manifold 132. Hence, each of the fractional raw gas streams is individually cleaned in a respective cleaning chamber 134.

The heat exchanger 140 receives a main stream of hot, raw gas from the main duct 29, and cools the raw gas before it enters the cleaning chambers 134, such that the hot gas will not cause damage to the cleaning chambers 134. A heat exchanger input damper 136 is located in the main duct 29 upstream of the heat exchanger 140, and a heat exchanger output damper 138 is located downstream of the heat exchanger 140. By closing the heat exchanger input and output dampers 136, 138, it is possible to isolate the heat exchanger 140 for service and maintenance. When the heat exchanger 140 is isolated, raw gas may be bypassed the heat exchanger 140 in a non-illustrated manner (dashed).

Similarly, each cleaning chamber 134a-c is provided with a cleaning chamber input damper 142a-c and a cleaning chamber output damper 144a-c, which make it possible to individually isolate each cleaning chamber 134a-c for service and maintenance. When a cleaning chamber 134a is isolated, raw gas may be cleaned in the other cleaning chambers 134b-c.

A fan 130 is located downstream of gas cleaning unit 22 to generate a negative pressure in the gas cleaning unit 22, such that raw gas is drawn from the electrolytic cells 14 (FIG. 1), through the gas cleaning unit 22 and the fan 130, to a smokestack (not shown) downstream of the fan 130. Each of the ducting sections and components located along the gas flow from the electrolytic cells 14 to the fan 130 induces a gas flow resistance, which may also be represented by a pressure drop. The pressure drop corresponds to an energy loss, which has to be accommodated for by providing a sufficient suction power at the fan 130.

Figure 3:
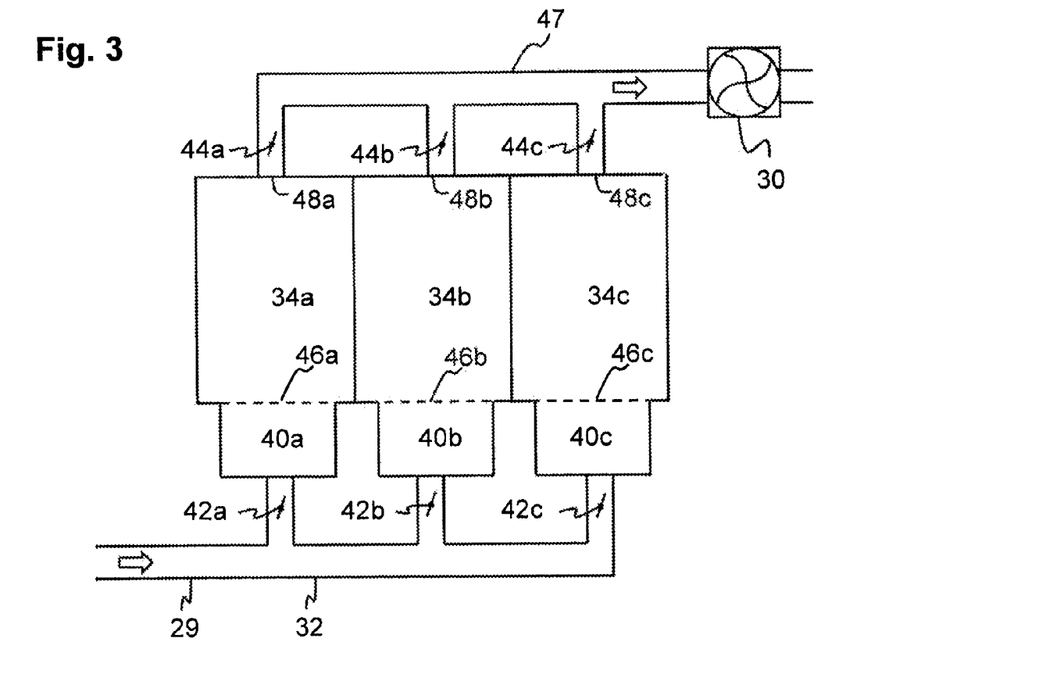
FIG. 3 is a schematic drawing of an alternative embodiment of a gas cleaning unit.

FIG. 3 illustrates an alternative embodiment of a gas cleaning unit 22. The gas cleaning unit 22 comprises three separate gas cleaning chambers 34a, 34b, 34c. The main raw gas stream arriving to the cleaning unit 22 in the main duct 29 is divided into three fractional raw gas streams in an inlet manifold 32, and each of the fractional raw gas streams is individually cleaned in a respective cleaning chamber 34a-c, so as to obtain three fractional streams of cleaned gas. Each gas cleaning chamber 34a-c is provided with a respective cleaning chamber inlet 46a-c for receiving raw gas from the inlet manifold 32. After cleaning, the three fractional streams of cleaned gas are recombined at an outlet manifold 47, which is connected to a respective outlet 48a-c of each individual cleaning chamber 34a-c.

Even though only three gas cleaning chambers 34a-c are illustrated in FIG. 3, a cleaning unit 22, serving a mirrored pair of potlines 16a, 16b (FIG. 1), may typically comprise from 2 to 60 cleaning chambers 34; hence, depending on the number of cleaning chambers, the inlet manifold 32 may divide the main raw gas stream into from 2 to 60 fractional raw gas streams, one for each gas cleaning chamber 34a-c. Similarly, the outlet manifold 47 may recombine from 2 to 60 fractional streams of cleaned gas into a single stream of cleaned gas. A single gas cleaning unit 22, comprising from 2 to 60 gas cleaning chambers 34, may thus clean the raw gas generated by from 50 to 1000 electrolytic cells 14.

A fan 30 is preferably located downstream of gas cleaning unit 22 to generate a negative pressure in the gas cleaning unit 22, such that raw gas is drawn from the electrolytic cells 14 (FIG. 1), through the gas cleaning unit 22 and the fan 30, to a smokestack 24 (FIG. 1) downstream of the fan 30.

Each gas cleaning chamber inlet 46a-c is provided with a respective heat exchanger 40a-c in order to cool the respective fractional streams of hot raw gas. Each of the heat exchangers 40a-c is located downstream, with respect to the flow direction of the respective fractional raw gas stream, of the inlet manifold 32. The gas cleaning unit 22 is also provided with three heat exchanger input dampers 42a-c, which are located in the input manifold 32 upstream of the respective heat exchangers 40a-c. Three respective cleaning chamber outlet dampers 44a-c are arranged at the individual cleaning chamber outlets 48a-c. Thereby, each of the cleaning chambers 34a-c and their respective heat exchangers 40a-c may be individually isolated for service and maintenance by closing the respective inlet and outlet dampers 42a-c, 44a-c. While one single cleaning chamber 34a is isolated, gas may flow through the other cleaning chambers 34b-c, thereby ensuring continuous operation of the gas cleaning unit 22.

Each of the heat exchangers 40a-c introduces a flow resistance, and hence also an associated pressure drop thereacross. Hence, the heat exchangers 40a-c located at each cleaning chamber input 46a-c have a leveling effect on the relative flow rates of the individual fractional gas streams. This may easier be understood considering that the pressure drop across an individual heat exchanger 40a-c represents a minimum total pressure drop across the entity consisting of the heat exchanger 40a-c plus its respective cleaning chamber 34a-c. By way of example, should the pressure drop across one cleaning chamber 34a fall significantly, e.g. due to a set of new, clean filter bags 56 having been installed in the cleaning chamber 34a, the flow resistance of the heat exchanger 40a will operate so as to maintain a raw gas pressure on the upstream side of the heat exchangers 40a-c, and thereby ensure that a sufficiently large portion of the raw gas will still flow through the cleaning chambers 34b, 34c having used, partly clogged filter bags.

The heat exchangers 40a-c will operate so as to more uniformly distribute the flow of raw gas to the cleaning chambers 34a-c also under other conditions, under which the flow resistance for any other reasons may differ between the individual cleaning chambers 34a-c. By way of example, such a condition may occur when having cleaned a filter present in one of the individual cleaning chambers 34a-c. The ability to maintain a sufficient flow through all the cleaning chambers 34a-c is not only of value from a load distribution point of view; the absence of a sufficient flow through a cleaning chamber 34 may also have severe consequences, as will be explained further below.

Even though each of the individual heat exchangers 34a-c introduces a pressure drop at the inlet of the respective cleaning chamber 34a-c, the total heat exchanger pressure drop may be lowered compared to the embodiment of FIG. 2. The reason for this is that the heat exchanger 140 requires separate inlet and outlet ducts, and separate inlet/outlet dampers 136, 138. Placing individual heat exchangers 40a-c at each cleaning chamber inlet 46a-c renders those components superfluous, which may reduce the heat exchanger pressure drop by more than 30%.

Figure 4:
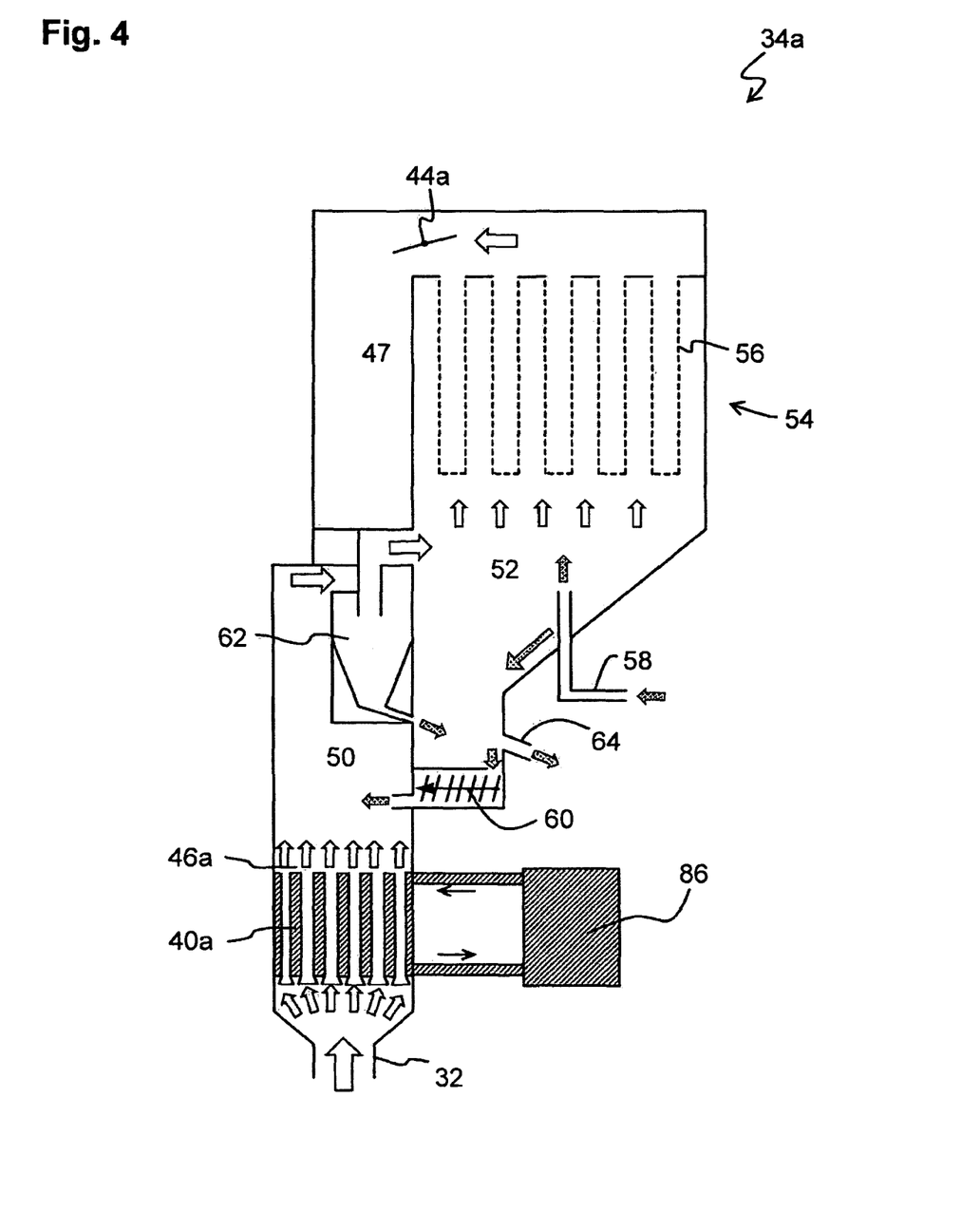
FIG. 4 is a schematic cross-section of a gas cleaning chamber, as seen from the side.

Referring now to FIG. 4, an exemplary cleaning chamber 34a, which may be arranged at the position of any of the cleaning chambers 34a-c integrated in the cleaning unit 22 accounted for hereinbefore, will now be described in detail. The cleaning chamber 34a operates according to the two-stage, counter-current dry absorption principle described in more detail in U.S. Pat. No. 5,885,539. In the cleaning chamber, the gas is scrubbed in a first dry absorption reactor 50, using secondary, spent alumina as sorbent, and in a second dry absorption reactor 52, using primary, fresh alumina as sorbent.

A fractional raw gas stream is provided via the inlet manifold 32, and passes through a heat exchanger 40a, which is located at the inlet 46a of the cleaning chamber 34a, before being cleaned in the first reactor 50 and the second reactor 52.

Filled arrows represent the flow of alumina sorbent through the cleaning chamber 34, whereas outlined, white arrows represent the flow of gas. Downstream of the second reactor 52, primary alumina is removed from the gas stream using a bag filter arrangement 54, which forms an upper wall of the second reactor 52. The bag filter arrangement 54 comprises a plurality of dust filter bags 56, upon which primary alumina forms a crust so as to increase the interaction between the primary alumina and the gas that is being cleaned. Primary alumina is supplied to the second reactor 52 via a primary alumina inlet 58. Alumina that has been partly spent, and thus has become secondary alumina, falls down to the bottom of the second reactor 52, and is transported to the first reactor 50 via a screw conveyor 60.

In the first reactor 50, the secondary alumina is mixed with a fractional raw gas stream entering the first reactor 50 via the cleaning chamber inlet 46a from below. As the gas passes from the first reactor 50 to the second reactor 52, secondary alumina is removed from the gas in a cyclone 62. The secondary alumina removed in the cyclone 62 is returned to the bottom of the second reactor 52, and recirculated back to the first reactor 50. An overflow outlet 64 allows any excess, spent alumina to exit the cleaning chamber 34a. The spent alumina exiting via overflow outlet 64 is transported to the electrolytic cells 14, to serve as raw material for aluminium production.

Should the raw gas flow into the first reactor 50 cease, a condition called alumina fall-out might occur. In the event of alumina fall-out, alumina otherwise held air-borne by the upwards-directed raw gas stream through the first reactor 50 would fall down and block the heat exchanger 40a, or the inlet manifold 32. In the event of an alumina fall-out, the cleaning chamber 34a may have to be taken out of service, and the cleaning chamber 34a or the inlet manifold 32 may have to be opened for removal of the fallen alumina. Hence, the ability to maintain the flow of a fractional raw gas stream to each cleaning chamber 34a-c (FIG. 3) under varying process conditions may be of value. Referring back again to FIG. 3, the presence of individual heat exchangers 40a-c at each cleaning chamber inlet 46a-c offers such ability, since the flow resistance introduced by each heat exchanger 40a-c will operate so as to distribute the raw gas entering the inlet manifold 32 relatively uniformly to the individual cleaning chambers 34a-c.

Another benefit with using heat exchangers 40a-c, compared to today's dominant cooling method of diluting the raw gas with ambient air, is that the raw gas flow rate into the gas cleaning unit 22 becomes relatively independent of the ambient temperature. When diluting the raw gas with ambient air, the number of cleaning chambers 34a-c in operation, and the flow rate into each cleaning chamber 34, need to be adjusted based on the ambient temperature and the weather. Furthermore, in order to obtain a sufficient cooling by diluting the raw gas with ambient air, up to about 1 m³ of ambient air may be required for cooling each m³ of undiluted raw gas. Hence, the use of a heat exchanger allows for smaller-scale gas cleaning units, as compared to cooling by ambient air dilution.

Preferably, the heat exchangers 40a-c should cool the raw gas to below 135° C. in order to spare the dust filter bags 56 (FIG. 4) from potentially harmful, excess temperature. Even more preferred, the heat exchangers 40a-c should cool the raw gas to below 115° C. in order to obtain an efficient scrubbing process and a low emission of hydrogen fluoride.

Figure 5:
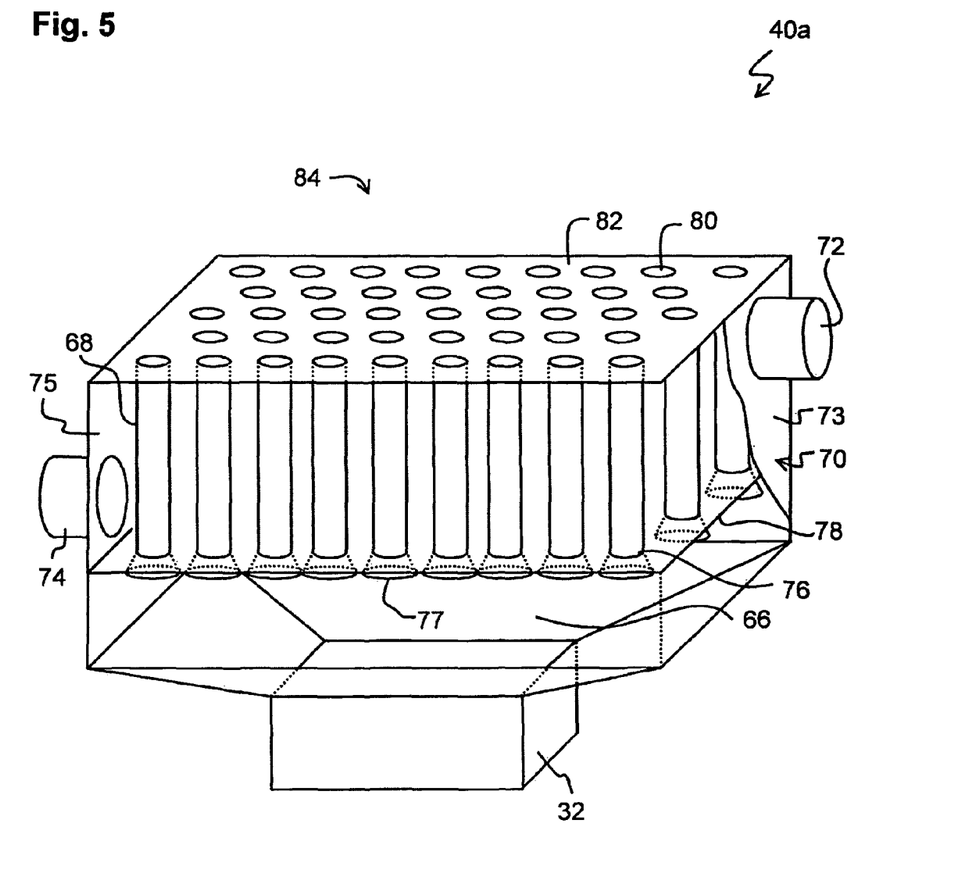
FIG. 5 is a schematic view in perspective, with parts broken away, of a heat exchanger.

Turning now to FIG. 5, the heat exchanger 40a of FIG. 4 comprises a raw gas inlet chamber 66 for receiving a fractional raw gas stream from the inlet manifold 32, and a plurality of mutually parallel raw gas cooling tubes 68 that are spaced apart. The cooling tubes 68 are housed in a coolant housing 70, which forms a fluid-tight compartment around the plurality of cooling tubes 68, thereby allowing a fluid coolant, such as water, to be in thermal contact with the cooling tubes 68. For reasons of clarity, the heat exchanger 40a of FIG. 5 is illustrated with parts of the coolant housing 70 broken away. And for the very same reason, the heat exchanger 40a is illustrated as having only about 40 cooling tubes 68; however, a typical heat exchanger may comprise up to several thousand tubes, even though from about 250 to about 800 cooling tubes in an individual heat exchanger 40a-c may be preferred. In an embodiment, the tubes 68 may have a circular cross-section with an inner diameter of from about 3 cm to about 8 cm. A typical tube length, that would balance the heat exchanging efficiency with the available space below a typical scrubber, as well as with a suitable flow resistance for obtaining a uniform distribution of raw gas to individual cleaning chambers 34a-b, would be from about 0.5 m to about 3 m. Steel is a suitable material for the tubes.

Coolant flows into the heat exchanger 40a via a coolant inlet 72 provided in an upper portion of a side wall 73 of the coolant housing 70, and is extracted from the heat exchanger 40a via a coolant outlet 74, which is provided in a lower portion of an opposing side wall 75 of the coolant housing 70. Hence, the coolant flows downwards, i.e. countercurrently to the fractional raw gas stream, which flows upwards in FIG. 5.

An inlet 76 of each cooling tube 68 is welded onto a cooling tube inlet plate 78, which forms part of the coolant housing. An outlet 80 of each cooling tube 68 is welded to a cooling tube outlet plate 82, which also forms part of the coolant housing 70. Perforations of the cooling tube inlet and outlet plates 78, 82 correspond to the respective inlets and outlets 76, 80 of the cooling tubes 68, such that raw gas may pass via the cooling tubes 68 from the raw gas inlet chamber 66 of the heat exchanger 40a to the inlet 46a (FIG. 4) of the first reactor 50, which also forms the inlet 46a of the cleaning chamber 34a.

The multiple parallel cooling tubes 68 in the heat exchanger 40a accelerate the raw gas in the direction of the cooling tubes 60, thereby obtaining a relatively well-directed, uniform flow direction. The directionality and speed of the raw gas results in a relatively low degree of scaling. Furthermore, the parallel cooling tube configuration makes it possible to obtain a relatively low pressure drop, i.e. energy loss. And by arranging the plurality of individual cooling tube outlets 80, which together form an aggregate heat exchanger outlet 84, such that the raw gas is discharged from the heat exchanger 40a directly into the first reactor 50 of the gas cleaning unit 34a, a better distribution of the gas flow across the cleaning chamber inlet 46a (FIG. 4) may be obtained. This may be better understood considering that in a single, large duct, such as the inlet manifold 32, the gas speed varies highly with the distance to the duct wall; this may be represented as a speed profile across a cross-section of the duct. This magnitude of this effect also depends on the shape of the duct's cross-section, such that certain duct shapes intrinsically result in stronger variations of the gas speed profile. Hence, if the inlet manifold 32 would be connected directly to the inlet 46*a* (FIG. 4) of the cleaning chamber, the gas speed would be significantly higher in the centre of the inlet 46*a* than near the duct walls. By instead connecting a heat exchanger outlet 84 directly to the inlet 46*a* of the cleaning chamber 34*a*, a more even gas speed profile, and a hence a more uniform distribution of the raw gas, may be obtained at the inlet 46*a* of the cleaning chamber. The reason for this is that a similar gas speed may be obtained through all parts of the heat exchanger 40*a*. The speed profile leveling effect is enhanced by the design using multiple parallel tubes 68, which may be given very similar flow resistance, and using a heat exchanger inlet chamber 66, which equalizes the raw gas pressure at the inlet 76 of the individual tubes 68.

Furthermore, by discharging the raw gas from the heat exchanger 40*a* directly into the cleaning chamber 34*a*, an improved mixing between the raw gas and the dry sorbent may be obtained. This is due to the acceleration of the raw gas in the heat exchanger 40*a*.

As an alternative to using similar tubes 68, the heat exchanger 40*a* may be designed using tubes 68 having properties, such as tube length, shape or width, that vary as a function of each tube's location within the heat exchanger 40*a*, so as to obtained any particular, desired gas flow profile across the heat exchanger outlet 84.

Each cooling tube 68 is provided with a cooling tube inlet funnel 77, i.e. a widened cooling tube inlet, which is welded onto the bottom side of the cooling tube inlet plate 78 and extends into the inlet chamber 66. The inlet funnels 77 accelerate the raw gas into the cooling tubes 68, and thereby even further reduce the risk of scaling inside the tubes 68. Furthermore, the use of inlet funnels 77 also levels the gas speed profile across each individual tube 68, which in turn propagates to an even more uniform raw gas speed profile at the cleaning chamber inlet 46*a*. Even though the inlet funnels 77 illustrated in FIG. 5 are conical, the funnels may have other shapes, such as a bell-shape.

Referring back again to the particular embodiment shown in FIG. 4, the heat exchanger outlet 84 (FIG. 5) extends across the entire cross-section of the cleaning chamber inlet 46*a*, and forms the floor of the first reactor 50. Thereby, there is virtually no dead space in the first reactor 50 where alumina may fall down and settle, as long as there is a continuous gas flow through the heat exchanger 40*a*.

The heat exchanger 40*a* of FIG. 4 is connected to a dump heat exchanger 86, which receives hot coolant from the heat exchanger 40*a*, discharges heat to the ambient air, and returns cooled coolant to the heat exchanger 40*a*. Alternatively, the heat transferred to the coolant in the heat exchanger 40*a* may be used elsewhere where heat may be needed, such as for heating buildings, desalinating sea water, or the like.

By locating individual heat exchangers 40*a-c* at each cleaning chamber inlet 46*a-c*, each heat exchanger can be designed for cooling a relatively small fractional raw gas flow. The heat exchangers 40*a-c* can thereby be made relatively small, such that they may easier share the mounting structures, access platforms, lighting, inspection lids etc. with the cleaning chambers 34*a-c*. Furthermore, mounting the heat exchangers 40*a-c* below the cleaning chambers 34*a-c* may save footprint at locations where space is limited.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

By way of example, it is not necessary that the heat exchangers 40*a-c* discharge the fractional raw gas streams directly into the cleaning chambers; a good distribution of the main raw gas stream into fractional raw gas streams may be obtained regardless of e.g. any ducting between each individual heat exchanger 40*a-c* and the respective cleaning chamber 34*a-c*. Furthermore, the heat exchanger tubes 40*a-c* may have any orientation, such as vertical, horizontal, etc. In fact, the heat exchangers 40*a-c* need not be of the stacked tube type; they can be of any type known to those skilled in the art. The heat exchangers 40*a-c* do not need to be located below the respective gas cleaning chambers 34*a-c*; they can be arranged at any location downstream of the cleaning chamber inlet manifold 32. It is not necessary that all inlets 46*a-c* be provided with a respective heat exchanger 40*a-c*; as an alternative, a plurality of inlets 46*a-b* may be provided heat exchangers 40*a-b*, and the pressure drop across the remaining cleaning chambers 34*c* may be controlled in any other manner, e.g. by means of a damper 42*c*. Furthermore, the gas cleaning chambers do not need to comprise a dry scrubber or a bag filter. The cleaning means of the gas cleaning chambers may be of any type, such as wet scrubbers and/or any suitable types of barrier filters. The gas cleaning unit and the gas cleaning method described hereinbefore are not limited to cleaning of raw gas in an aluminium production plant; the gas cleaning unit and the method may be used for cleaning raw gas generated by other industrial processes as well.

The invention claimed is:

1. A gas cleaning unit for cleaning a main raw gas stream from a plant, the gas cleaning unit comprising:
 a plurality of gas cleaning chambers, each gas cleaning chamber equipped with a cleaning chamber inlet;
 an inlet manifold, for dividing said main raw gas stream flowing therethrough into a plurality of separate fractional raw gas streams for flow to said cleaning chamber inlets; and
 a plurality of heat exchangers, each heat exchanger located downstream of the inlet manifold for exchanging heat with a respective fractional raw gas stream entering a respective cleaning chamber;
 wherein each of the heat exchanges is arranged to generate a pressure drop in the fractional raw gas stream passing through that heat exchanger such that a leveling effect on flow rates of the individual fractional gas streams occurs to uniformly distribute flow of the raw gas to said gas cleaning chambers.

2. The gas cleaning unit according to claim 1, wherein each of the heat exchangers is located at the respective cleaning chamber inlet.

3. The gas cleaning unit according to claim 1, wherein each of said heat exchangers have an outlet arranged for discharging raw gas directly into the respective cleaning chamber.

4. The gas cleaning unit according to claim 1, wherein each of said heat exchangers comprises a raw gas inlet chamber for receiving a fractional raw gas stream, and a plurality of mutually parallel raw gas cooling tubes that are spaced apart.

5. The gas cleaning unit according to claim 4, wherein each raw gas cooling tube has a cooling tube inlet funnel for accelerating raw gas into the cooling tube.

6. The gas cleaning unit according to claim 4, wherein the cooling tubes stand vertically.

7. The gas cleaning unit according to claim 1, wherein each of said gas cleaning chambers comprises a dry scrubber having said respective heat exchanger arranged at a raw gas inlet located in a lower portion thereof.

8. The gas cleaning unit according to claim 1, wherein said plant comprises a plurality of electrolytic cells for producing aluminium using the Hall-Héroult process, and said raw gas is flue gas generated in said Hall-Héroult process.

9. The gas cleaning unit according to claim 1, wherein each of said cleaning chambers is provided with an inlet damper located between the respective heat exchanger and the inlet manifold.

10. The gas cleaning unit according to claim 1, further comprising an outlet manifold for connecting all cleaning chambers to an output stack.

11. A method for cleaning a main raw gas stream, comprising:
dividing said main raw gas stream into a plurality of fractional raw gas streams; and
cooling individually each of said fractional raw gas streams using a plurality of respective heat exchangers, so as to obtain a plurality of cooled fractional raw gas streams to be individually cleaned; and
generating a pressure drop in the fractional raw gas stream passing through each heat exchanger to provide a leveling effect on flow rates of the individual fractional gas streams to uniformly distribute flow of the raw gas to gas cleaning chambers.

12. A method for cleaning a main raw gas stream, comprising:
dividing said main raw gas stream into a plurality of fractional raw gas streams;
cooling individually each of said fractional raw as streams using a plurality of respective heat exchangers, so as to obtain a plurality of cooled fractional raw gas streams to be individually cleaned; and
individually discharging each of said fractional raw gas streams directly from an outlet of the respective heat exchanger into a respective cleaning chamber.

13. The method according to claim 12, wherein each of said fractional raw gas streams is cooled in a heat exchanger comprising a raw gas inlet chamber for receiving a fractional raw gas stream, and a plurality of mutually parallel raw gas cooling tubes that are spaced apart, with each raw gas cooling tube having a cooling tube inlet funnel for accelerating raw gas into the cooling tube.

14. The method according to claim 12, further comprising:
introducing each of said plurality of cooled fractional raw gas streams into the lower portion of a dry scrubber.

15. The method according to claim 12, wherein said main raw gas stream is generated by a Hall-Héroult aluminium production process.

16. The method according to claim 12, further comprising:
individually controlling the flow of each of the fractional raw gas streams into the respective heat exchangers.

17. The method according to claim 11, wherein each of said fractional raw gas streams is cooled in a heat exchanger comprising a raw gas inlet chamber for receiving a fractional raw gas stream, and a plurality of mutually parallel raw gas cooling tubes that are spaced apart, with each raw gas cooling tube having a cooling tube inlet funnel for accelerating raw gas into the cooling tube.

18. The method according to claim 11, further comprising:
introducing each of said plurality of cooled fractional raw gas streams into the lower portion of a dry scrubber.

19. The method according to claim 11, wherein said main raw gas stream is generated by a Hall-Héroult aluminium production process.

20. The method according to claim 11, further comprising:
individually controlling the flow of each of the fractional raw gas streams into the respective heat exchangers.

\* \* \* \* \*